United States Patent
Chung (10) Patent No.: US 8,237,864 B2
(45) Date of Patent: Aug. 7, 2012

(54) SYSTEMS AND METHODS FOR ASSOCIATING METADATA WITH SCENES IN A VIDEO

(75) Inventor: Ming-Hung Chung, Taipei (TW)

(73) Assignee: Cyberlink Corp., Shindian, Taipei (TW)

( * ) Notice: Subject to any disclaimer, the term of this patent is extended or adjusted under 35 U.S.C. 154(b) by 1266 days.

(21) Appl. No.: 11/938,535

(22) Filed: Nov. 12, 2007

(65) Prior Publication Data
US 2009/0122196 A1  May 14, 2009

(51) Int. Cl.
*H04N 9/74* (2006.01)
*H04N 5/272* (2006.01)
*H04N 5/262* (2006.01)
*G06F 3/14* (2006.01)

(52) U.S. Cl. ........ 348/578; 348/586; 715/723; 386/280; 725/32

(58) Field of Classification Search ............... 348/578; 725/32; 715/723, 726, 728; 386/270, 280
See application file for complete search history.

(56) References Cited

U.S. PATENT DOCUMENTS

| | | | | |
|---|---|---|---|---|
| 4,951,144 A * | 8/1990 | Des Jardins | ................... | 348/578 |
| 5,008,755 A * | 4/1991 | Brain | ........................... | 348/578 |
| 5,355,450 A * | 10/1994 | Garmon et al. | ................. | 345/501 |
| 5,638,133 A * | 6/1997 | Squier et al. | .................... | 348/590 |
| 5,892,554 A * | 4/1999 | DiCicco et al. | ............... | 348/584 |
| 5,966,121 A * | 10/1999 | Hubbell et al. | ............... | 715/726 |
| 5,995,095 A * | 11/1999 | Ratakonda | .................... | 715/255 |
| 6,392,710 B1 * | 5/2002 | Gonsalves et al. | ............ | 348/578 |
| 6,771,703 B1 * | 8/2004 | Oguz et al. | ............... | 375/240.03 |
| 7,184,100 B1 * | 2/2007 | Wilf et al. | ..................... | 348/700 |
| 2007/0177675 A1 * | 8/2007 | Kawa et al. | ............. | 375/240.25 |
| 2007/0204310 A1 * | 8/2007 | Hua et al. | ........................ | 725/88 |
| 2008/0159383 A1 * | 7/2008 | Kukreja et al. | .......... | 375/240.01 |
| 2009/0079840 A1 * | 3/2009 | Gandhi et al. | ............. | 348/222.1 |
| 2010/0325657 A1 * | 12/2010 | Sellers et al. | .................. | 725/32 |

* cited by examiner

*Primary Examiner* — Pankaj Kumar
*Assistant Examiner* — Reuben M Brown
(74) *Attorney, Agent, or Firm* — Thomas, Kayden, Horstemeyer & Risley, LLP

(57) ABSTRACT

Systems and methods for associating metadata with scene changes are described. At least one embodiment includes a system for associating metadata with a video. The system comprises an input module for reading a first video, wherein the input module is configured to receive special effects specified by a user and an insertion point in which to insert the special effects. The system further comprises a key frame module for identifying at least one key frame preceding the specified insertion point, the key frame comprising at least one of a scene change and a particular scene identified by the user. The system also includes a metadata module for calculating time differences between the insertion point and the one or more key frames, the metadata module further configured to store the special effects input by the user, the insertion point, the time differences, and key frames as metadata.

In accordance with some embodiments, the system further comprises an insertion module for reading a second video and inserting the special effects specified for the first video into the second video, where the insertion module is further configured to read the stored metadata and identify a matching key frame within the second video. The insertion module is further configured to add the time difference associated with the key frame stored within the metadata to the matching key frame to determine an insertion point for the second video and add the special effects at the insertion point for the second video.

16 Claims, 9 Drawing Sheets

SYSTEMS AND METHODS FOR ASSOCIATING METADATA WITH SCENES IN A VIDEO

TECHNICAL FIELD

The present disclosure generally relates to video editing and more particularly, relates to associating metadata with scene changes in a video.

BACKGROUND

Over the years, digital video content has gained increasing popularity with consumers. With the ever-growing amount of audio and video content available to consumers through broadcast, cable, on-demand, fixed media, and other available sources of multimedia content, consumers have easy access to a vast amount of content and programming. Furthermore, many devices (e.g., PCs, DVD recorders) and services that are readily available allow consumers to record, time-shift or view on-demand video and audio content. Furthermore, an increasing amount of video content is becoming available over the Internet and other data services in the form of downloadable content such as IPTV (Internet Protocol Television) delivered video services.

Many off-the-shelf video editing applications provide users with the capability to incorporate special effects into captured images, audio and video. Generally, video content can be stored in any number of common formats such as MPEG-1, MPEG-2, or DV (digital video), for example. The availability of multimedia content in a vast array of digital formats has facilitated distribution of multimedia content because of the high degree of portability. However, one perceived shortcoming with conventional approaches to video editing is that these applications do not provide support for the same video recorded across different encoding formats or even for videos that vary slightly in content. For example, a consumer might incorporate special effects into a movie on a DVD and might want to view the same special effects on a special edition of the same DVD where additional scenes are included. As another example, a consumer might incorporate special effects into a movie recorded on a VCD (video CD) and might want to incorporate the same special effects into the same movie recorded on a DVD. Consumers are limited to incorporating special effects into a particular video (or copies of the same video). As such, special effects created for one video cannot readily be imported into a video encoded in a different format. Therefore, a need exists in the industry to address these deficiencies and inadequacies.

SUMMARY

Briefly described, one embodiment, among others, includes a system for associating metadata with a video. The system comprises an input module for reading a first video, wherein the input module is configured to receive special effects specified by a user and an insertion point in which to insert the special effects. The system further comprises a key frame module for identifying at least one key frame preceding the specified insertion point, the key frame comprising at least one of a scene change and a particular scene identified by the user. The system also includes a metadata module for calculating time differences between the insertion point and the one or more key frames, the metadata module further configured to store the special effects input by the user, the insertion point, the time differences, and key frames as metadata.

In accordance with some embodiments, the system further comprises an insertion module for reading a second video and inserting the special effects specified for the first video into the second video, where the insertion module is further configured to read the stored metadata and identify a matching key frame within the second video. The insertion module is further configured to add the time difference associated with the key frame stored within the metadata to the matching key frame to determine an insertion point for the second video and add the special effects at the insertion point for the second video.

Another embodiment includes a method for associating metadata with a video. The method comprises receiving special effects specified by a user, receiving an insertion point identified by the user, identifying at least one key frame preceding the insertion point, calculating time differences between the insertion point and the at least one key frame, and storing the special effects, the insertion point, and the time differences as metadata.

In some embodiments, the method further comprises reading a second video, accessing key frame information from the stored metadata and identifying a matching key frame within the second video, adding the associated time difference stored within the metadata to the matching key frame to determine an insertion point for the second video, and inserting the special effects specified for the first video into the second video at the insertion point for the second video.

Another embodiment includes a program stored on a computer readable medium. The program comprises logic for receiving special effects specified by a user, logic for receiving an insertion point from the user, logic for identifying at least one key frame preceding the insertion point, logic for calculating time differences between the insertion point and the at least one key frame, and logic for storing the special effects, the insertion point, and the time differences as metadata.

According to some embodiments, the program may further comprise logic for reading a second video, logic for accessing key frame information from the stored metadata and identifying a matching key frame within the second video, logic for adding the associated time difference stored within the metadata to the matching key frame to determine an insertion point for the second video, and logic for inserting the special effects specified for the first video into the second video at the insertion point for the second video.

Yet another embodiment includes a video editing method. The method comprises retrieving information associated with a first video of a first format, where the retrieved information comprises a special effect, an identified key frame, and a time difference. The method further comprises receiving a second video in a second format, detecting a key frame that corresponds to the identified key frame, and adding the special effect to the second video at a point in time after the detected second key frame, the point in time equal to the time difference.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

It should be noted that the drawings presented herein have been provided to illustrate certain features and aspects of embodiments of the invention. It should be appreciated from the description provided herein that a variety of alternative embodiments and implementations may be realized, consistent with the scope and spirit of the present invention.

As summarized above, embodiments described herein include systems and methods for associating metadata with scene changes in a video. Embodiments of the present invention further provide for incorporating the metadata into a second video, which might be encoded in a different format or stored on a different storage medium, for example. Broadly, the functionality of certain embodiments provide for allowing a user to view a video and select an insertion point within the video in which to insert metadata. Embodiments described herein therefore address various perceived shortcomings to conventional approaches for video editing by allowing users to import special effects created for a video recorded in one format into the same video recorded in a different format.

For purposes of nomenclature used herein, the term metadata broadly refers to any information regarding data such as a video, for example. In this respect, metadata may describe a video and may be utilized in a wide variety of ways. As non-limiting examples, metadata might contain miscellaneous information about a given video such as the title, chapter list, content rating (e.g., General (G), Parental Guidance (PG), PG-13, Restricted (R)), performers (actors, actresses, musicians, etc.), genre (adventure, romance, action, etc.) and a brief synopsis of the video. As will be described in more detail below, metadata can also be used to store such information as special effects that have been incorporated into a video. For example, a user may have incorporated a custom audio track or some type of graphics for a particular scene within the video. These special effects might be stored as metadata. In this regard, metadata may be utilized to facilitate portability and management of data regarding video.

While particular scenes or frames within a video may be referred to interchangeably herein as "scene changes" or "key frames," it should be noted that the term "scene change" more specifically refers to transition points within a video where a scene change occurs. The term "key frames" may comprise not only scene changes/transition points but may generally comprise any time instant with the video. The particular time instant may be pre-determined or designated by a user. As a non-limiting example of a key frame, a video might include some predefined text or image such as "Chapter 1" or the closing credits at the end of a movie. As another non-limiting example, a user might designate as a key frame the moment the main character of a movie first appears.

Figure 1:
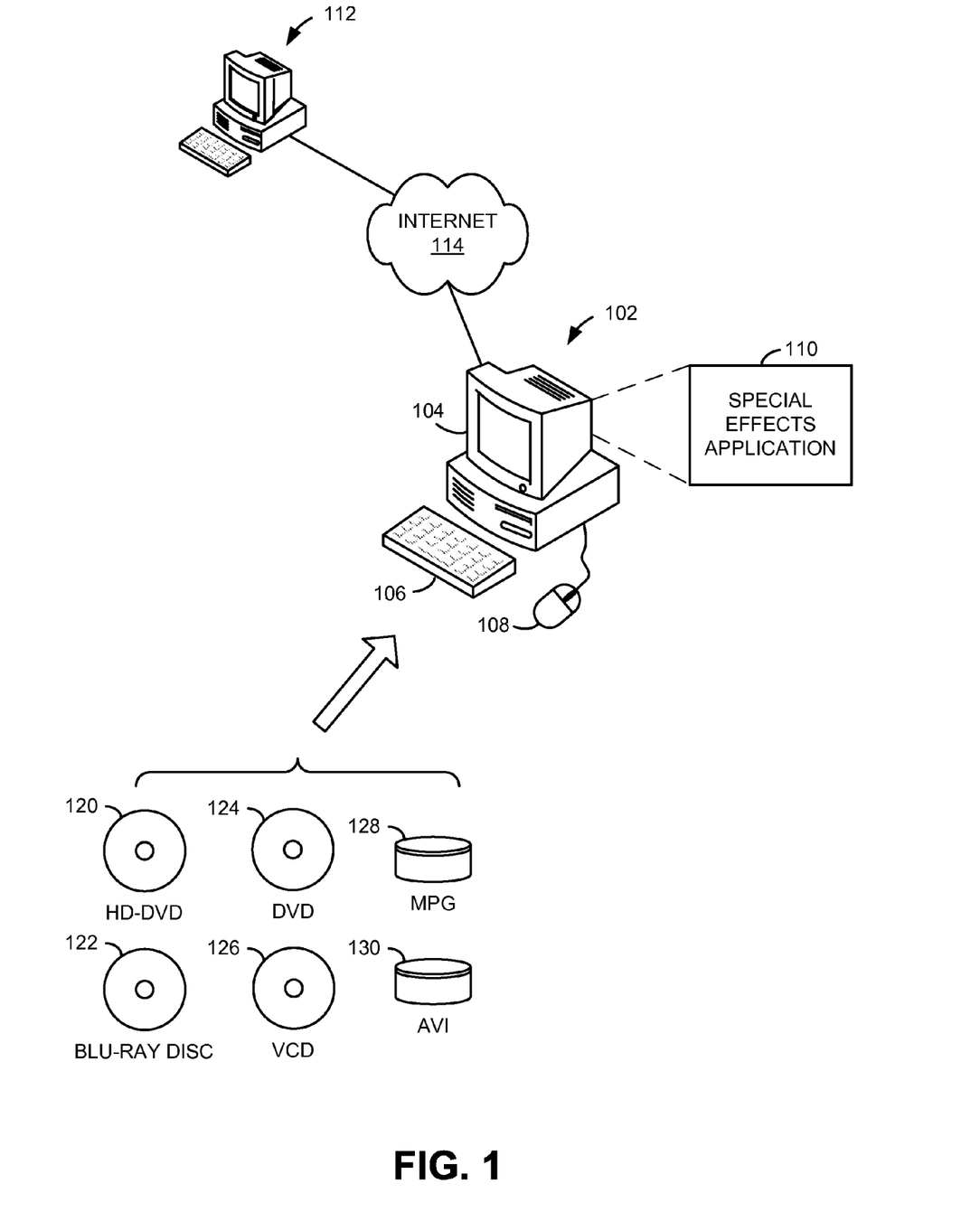
FIG. 1 depicts a top-level diagram for an embodiment of a system for associating metadata with scene changes in a first video and incorporating the metadata in a second video.

Reference is now made to FIG. 1, which depicts a top-level diagram of an embodiment of a system for associating metadata with scene changes in a first video and incorporating the metadata in a second video. For some embodiments, a system for associating metadata with scene changes in a first video and importing the metadata into another video may incorporated in a computing device 102, such as a computer workstation or a laptop, for example. The computing device 102 may include a display 104 and input devices such as a keyboard 106 and a mouse 108. Furthermore, the computing device 102 may execute a special effects application 110, which a user might utilize to view a video, input special effects, and select an insertion point within the video in which to incorporate the special effects, for example.

As illustrated in FIG. 1, the computing device 102 can be configured so that the computing device 102 is capable of reading media content in various formats or stored on various types of storage media. As non-limiting examples, the computing device 102 is capable of reading media content encoded in such formats as Digital Video Disc (DVD) 124, video CD (VCD) 126, and newer formats such as High Definition DVD (HD-DVD) 120 and Blu-ray Disc 122. Other non-limiting examples include MPEG-1, MPEG-2, MPEG-4, H.264, 3GPP, 3GPP-2, Standard-Definition Video (SD-Video), High-Definition Video (HD-Video), Digital Television Video/High-definition Digital Television (DTV/HDTV) multimedia, AVI, digital video (DV), QuickTime (QT) file, Windows Media Audio (WMA), Windows Media Video (WMV), Advanced System Format (ASF), or any number of other popular digital multimedia formats. The above exemplary formats are merely examples, and it is intended that the various embodiments described herein cover any type of multimedia content in its broadest sense.

The computing device 102 accepts the storage media 120, 122, 124, 126, 128, 130 containing the video content and plays back the video for a user to view. In some embodiments, the computing device 102 may be further coupled to a network, such as the Internet 114. For such embodiments, video may be downloaded from another computing device 112 also coupled to the Internet 114. The user may then utilize the special effects application 110 to edit the video.

Figure 2:
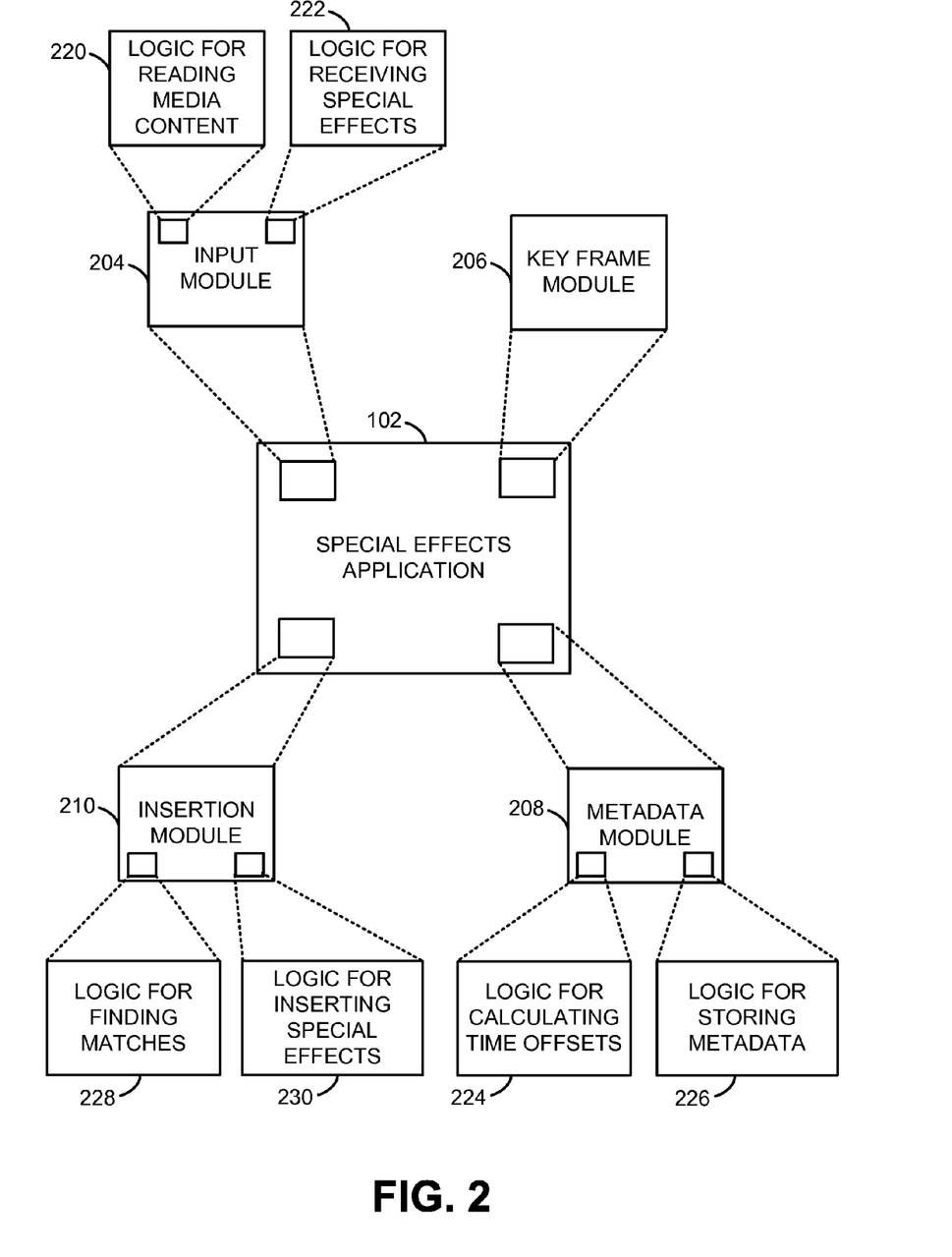
FIG. 2 is a block diagram illustrating various components of the system in FIG. 1.

Reference is now made to FIG. 2, which is a block diagram illustrating various components of the system in FIG. 1. For some embodiments, the special effects application 102 shown in FIG. 1 may comprise an input module 204, a key frame module 206, a metadata module 208, and an insertion module 210. The input module 204 further comprises logic for both reading video content 220 (such as a DVD or a Blu-ray Disc, for example) and allowing a user to view the video. The input module 204 further comprises logic for receiving special effects 222, which may be input by the user as the user is viewing the video. The input module 204 is further configured to capture the insertion point within the video in which to insert the specified special effects.

The key frame module 206 analyzes the video and analyzes the video to identify scene changes or key frames. With regard to identifying scene changes, the algorithm for performing such operations is not significantly changed from prior art approaches and therefore need not be described herein. For example, methods for detecting abrupt and gradual scene changes in image sequences are known and substantially unchanged by the present invention and therefore need not be described. Similarly, methods for filtering selected key frames and creating a visual index are known. It should be noted, however, that the key frame module 206 may be configured to identify a certain number of scene changes or key frames. Furthermore, the key frame module 206 may be configured to designate the one or more scene change as one or more key frames and identify the key frame closest in time to the insertion point specified by the user.

The metadata module 208 further comprises logic for calculating time offsets 224. The time offset for a particular key frame is the difference in time between the insertion point and the key frame. The calculated time offset is then associated with that particular scene change. The one or more time offsets will later be used to import the special effects into a second video. The metadata module 208 further comprises logic for storing metadata 226. As described above, metadata may include any type of information related to the video. For exemplary embodiments, the special effects, insertion point, identified scene changes, and time offsets are all determined and stored as metadata for later use.

The insertion module 210 further comprises logic for finding scene change matches within the second video 228. In the context of the present disclosure, the second video generally refers to a different copy of the same video content but not necessarily stored in the same format. For example, a second video may comprise a movie stored on a VCD, and the first video is the same movie stored on a DVD. As another non-limiting example, a first video might comprise a DVD and a second video might comprise a special edition DVD, which includes additional scenes. For some embodiments, the logic for finding matches within the second video 228 may be configured to look for only a single match with a key frame. In other embodiments, the logic 228 may be configured to look for a minimum number of key frame matches to insure that the special effects are inserted at the correct point in time. The insertion module 210 further comprises logic for inserting special effects 230. Upon finding a number of scene change matches, the time offsets corresponding to those particular scene changes is read from the metadata. The correct insertion point can then be derived by adding the time offset to the identified scene change or key frame.

Figure 3:
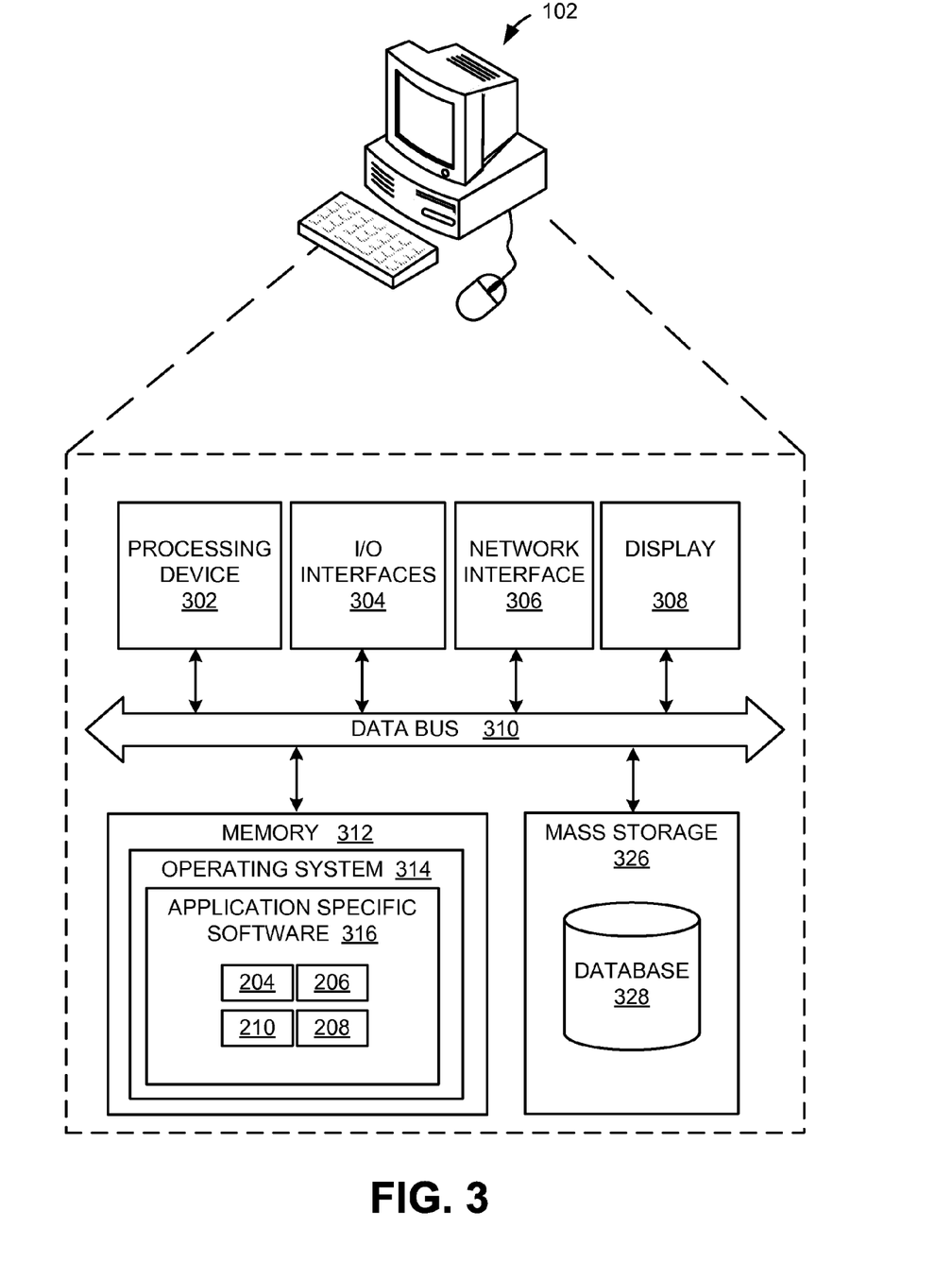
FIG. 3 illustrates an embodiment of the computing device shown in FIG. 1 for executing the various components shown in FIG. 2.

Reference is now made to FIG. 3, which illustrates an embodiment of the computing device shown in FIG. 1 for executing the various components shown in FIG. 2. Generally speaking, the computing device 102 can comprise any one of a wide variety of wired and/or wireless computing devices, such as a desktop computer, portable computer, dedicated server computer, multiprocessor computing device, cellular telephone, personal digital assistant (PDA), handheld or pen based computer, embedded appliance and so forth. Irrespective of its specific arrangement, computing device 102 can, for instance, comprise memory 312, a processing device 302, a number of input/output interfaces 304, a network interface 306, a display 308, and mass storage 326, wherein each of these devices are connected across a data bus 310.

Processing device 302 can include any custom made or commercially available processor, a central processing unit (CPU) or an auxiliary processor among several processors associated with the computing device 102, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 312 can include any one of a combination of volatile memory elements (e.g., random-access memory (RAM, such as DRAM, and SRAM, etc.)) and nonvolatile memory elements (e.g., ROM, hard drive, tape, CDROM, etc.). The memory 312 typically comprises a native operating system 314, one or more native applications, emulation systems, or emulated applications for any of a variety of operating systems and/or emulated hardware platforms, emulated operating systems, etc. For example, the applications may include application specific software 316 such as the special effects application 202, which may include any of the input module 204, the key frame module 206, the metadata module 208, and the insertion module 210. One of ordinary skill in the art will appreciate that the memory 312 can, and typically will, comprise other components which have been omitted for purposes of brevity.

Input/output interfaces 304 provide any number of interfaces for the input and output of data. For example, where the computing device 102 comprises a personal computer, these components may interface with user input device 304, which may be a keyboard or a mouse, as shown in FIG. 1. Where the computing device 102 comprises a handheld device (e.g., PDA, mobile telephone), these components may interface with function keys or buttons, a touch sensitive screen, a stylist, etc. Display 308 can comprise a computer monitor or a plasma screen for a PC or a liquid crystal display (LCD) on a hand held device, for example.

With further reference to FIG. 3, network interface device 306 comprises various components used to transmit and/or receive data over a network environment. By way of example, the network interface 306 may include a device that can communicate with both inputs and outputs, for instance, a modulator/demodulator (e.g., a modem), wireless (e.g., radio frequency (RF)) transceiver, a telephonic interface, a bridge, a router, network card, etc.). The computing device 102 may further comprise mass storage 326. For some embodiments, the mass storage 326 may include a database 328 to store and manage such data as metadata.

Figure 4A:
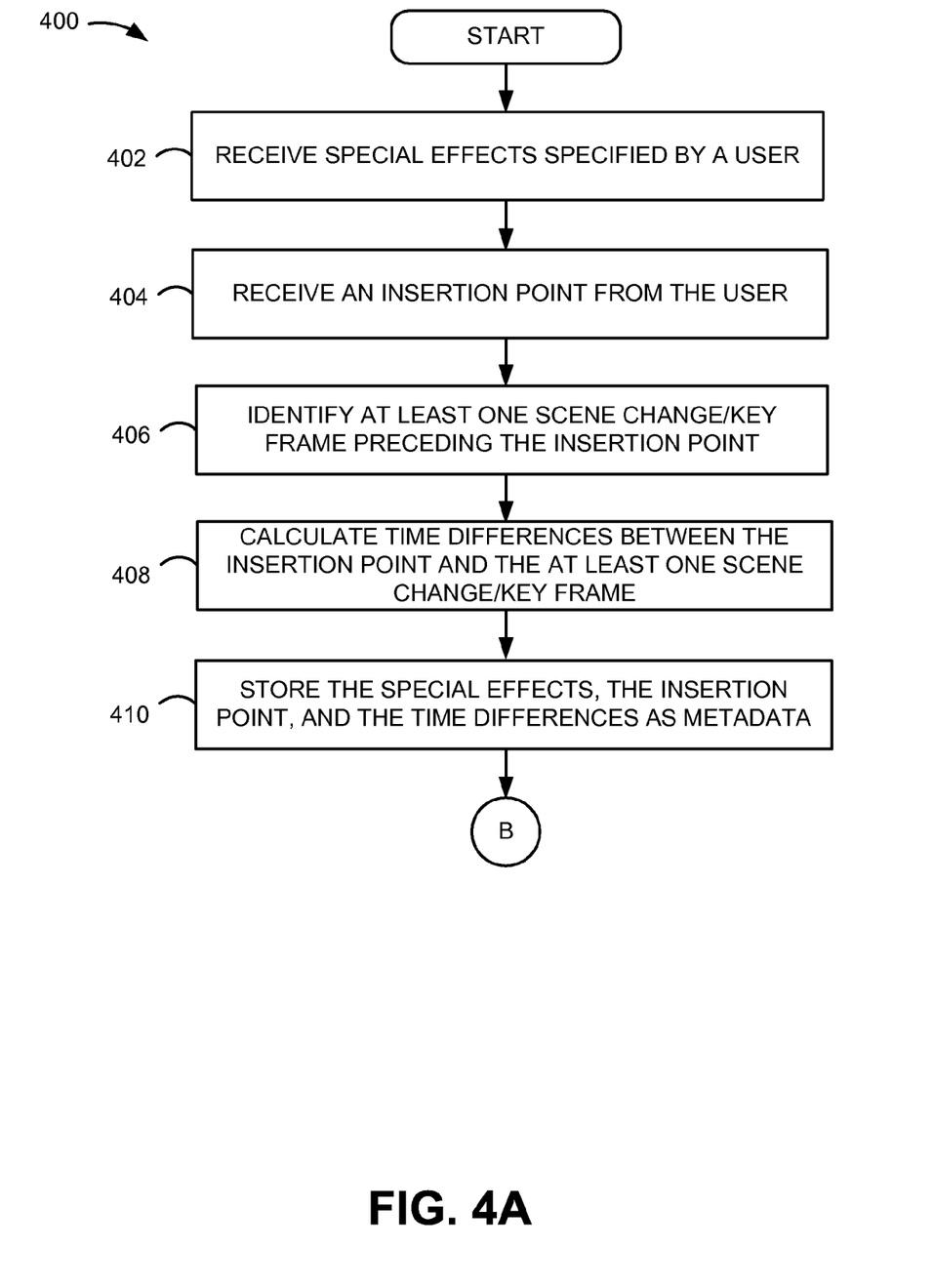
FIGS. 4A-4B depict an exemplary embodiment of a method for associating metadata with scene changes in a first video and incorporating the metadata in a second video.
Figure 4B:
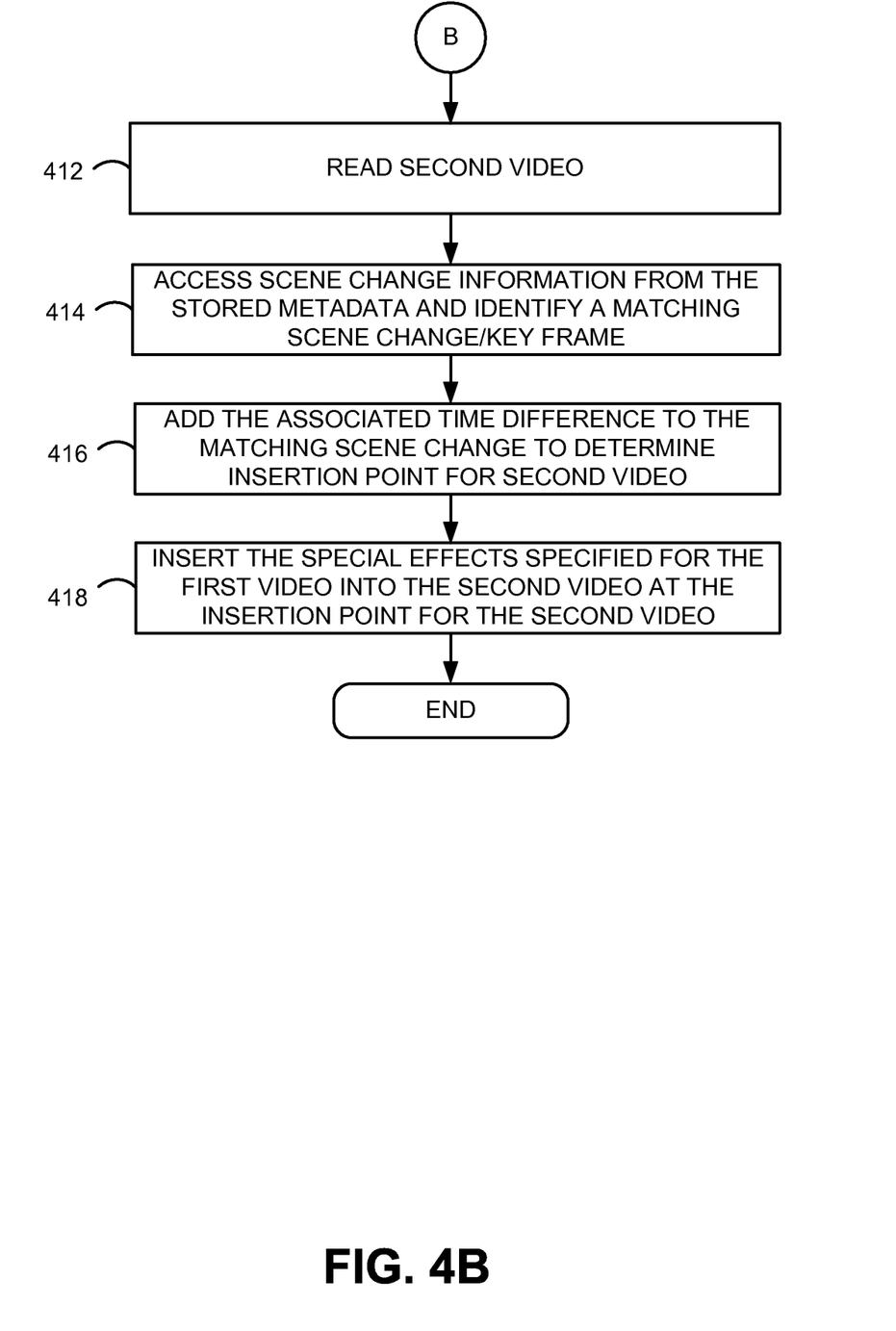

FIGS. 4A-4B depict an exemplary embodiment of a method for associating metadata with scene changes in a first video and incorporating the metadata in a second video. Beginning at block 402 in FIG. 4A, special effects are entered by a user. In block 404, the user also specifies an insertion point for inserting the special effects. Scene changes preceding the insertion point are then identified in block 406. For some embodiments, only the closest scene change might be determined. In other embodiments, a plurality of scene changes/key frames might be determined to insure that the insertion point in the second video is later accurately derived. In block 408, the time difference from each of the one or more scene changes are calculated and associated with the scene change or key frame. The special effects along with the specified insertion point are then stored as metadata for later use. The calculated time differences and each of the scene changes are also stored as metadata.

Beginning at node B in FIG. 4B, a second video in which the special effects are to be incorporated is read in block 412. In block 414, the metadata is accessed and the scene change/key frame information derived for the first video is read. The second video is then analyzed for matching scene changes. In block 416, the calculated time difference associated with each particular scene change is added to the matching scene change within the second video to determine the corresponding insertion point within the second video. In block 418, the special effects stored within the metadata are then incorporated into the second video at the derived insertion point. Generally, while at least one matching scene change must be found in the second video, for some embodiments, multiple scene change matches might be preferred in order to insure accuracy in deriving the assertion point within the second video.

Figure 5:
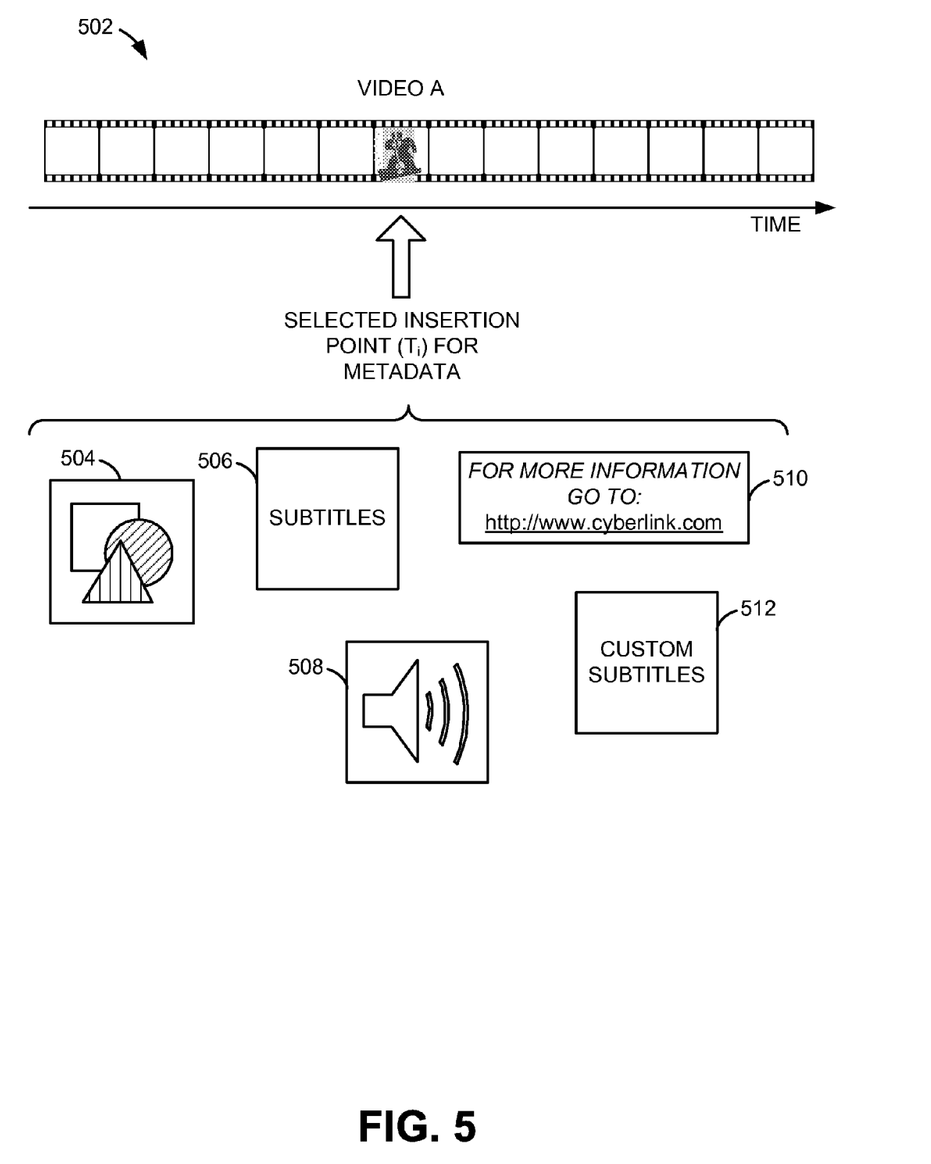
FIG. 5 illustrates the step shown in the exemplary method of FIG. 4 for selecting an insertion point in a first video and selecting special effects.

FIG. 5 illustrates the step shown in the exemplary method of FIG. 4 for selecting an insertion point in a first video and selecting special effects. In some embodiments, the user views a first video (Video A) 502 and pauses the video 502 in order to incorporate special effects. In other embodiments, the user might simply select a chapter on a DVD to designate an insertion point. In certain embodiments, the user may then select from pre-defined special effects. Alternatively, the user may elect to define customized special effects. Non-limiting examples of special effects include: graphics 504, subtitles 506 (such as those originally encoded with the video), custom subtitles 512 (e.g., text entered by the user), audio tracks 508, and hyperlinks 510. By way of illustration, a user may elect to display, for example, a hyperlink when a particular actor appears in a scene. The hyperlink might provide a biography of the actor, for instance.

Figure 6:
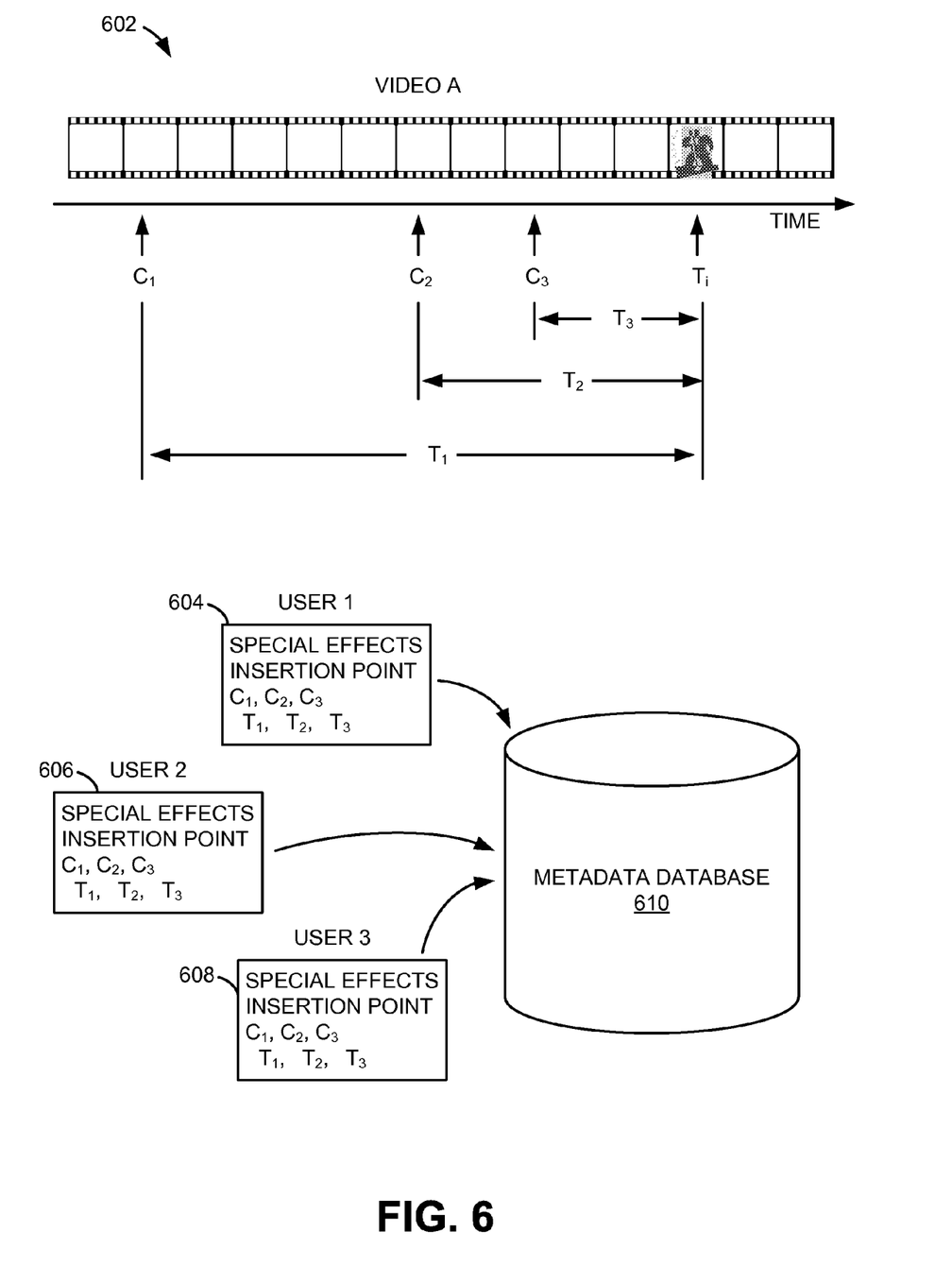
FIG. 6 illustrates the step shown in the exemplary method of FIG. 4 for determining time offsets based on identified scene changes and for storing the information as metadata.

FIG. 6 illustrates the step shown in the exemplary method of FIG. 4 for determining time offsets based on identified scene changes and for storing the information as metadata. After the user specifies the insertion point (denoted as $T_i$ in FIG. 6) and corresponding special effects, the video is analyzed and scene changes preceding the insertion point are identified. As discussed earlier, with regard to identifying scene changes, the algorithm for performing such operations is not significantly changed from prior art approaches and therefore need not be described herein. Although FIG. 6 shows three scene changes or key frames, it should be appreciated that, consistent with the scope and spirit of the present invention, any number of scene changes or key frames may be identified.

The time offsets for each of the identified scene changes/key frames are calculated. The time offsets ($\Delta T_1$, $\Delta T_2$, $\Delta T_3$) are later used to derive the insertion point for the second video. The special effects, insertion point, identified scene changes and corresponding time offsets are then stored as metadata. As depicted in FIG. 6, it should be noted that for some embodiments, multiple users can define special effects for the same video (e.g., Video A). Metadata is generated for each of the users and is then stored in a metadata database 610. Referring back briefly to FIG. 3, the metadata database may be stored in the mass storage 326 of the computing device 102.

Figure 7:
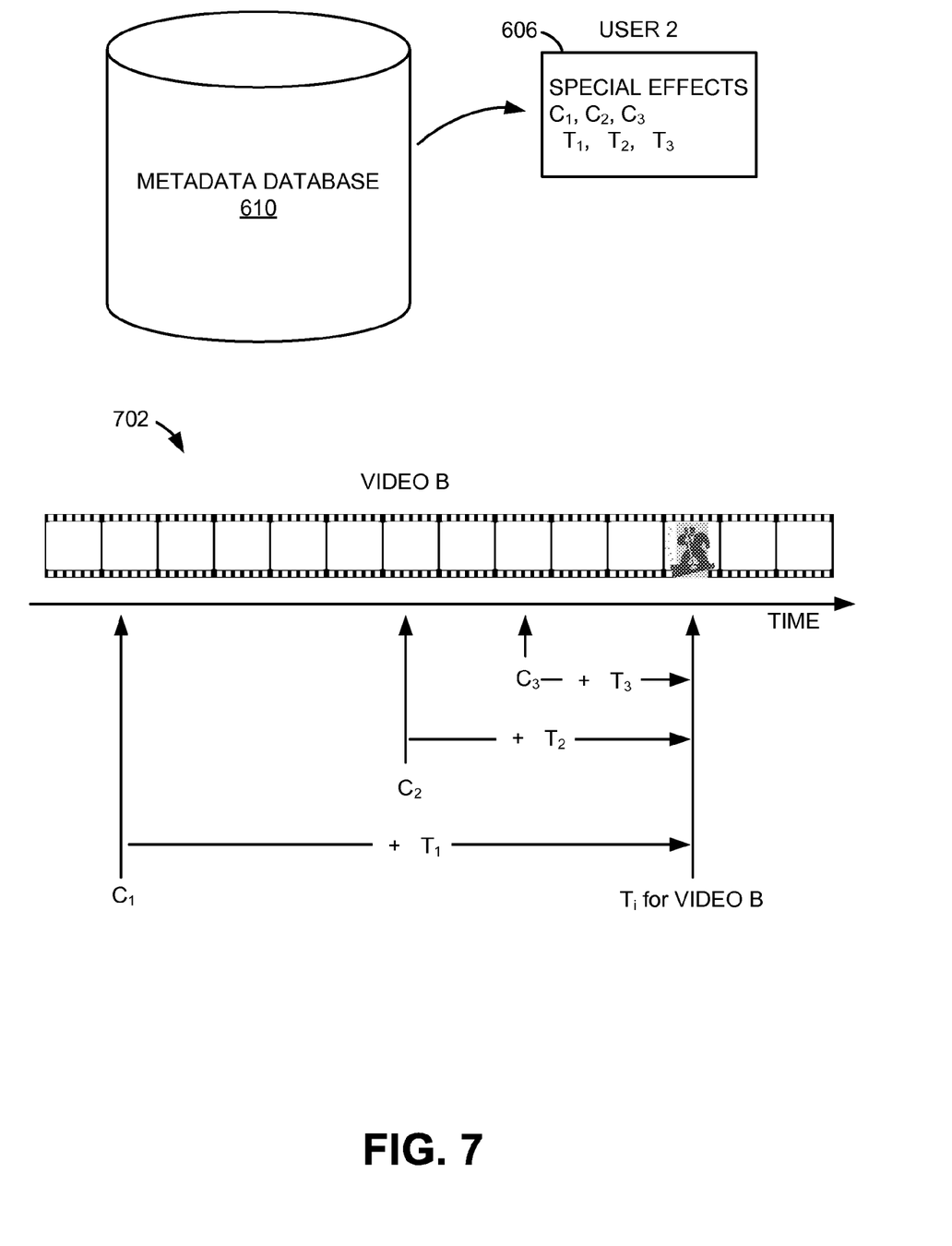
FIG. 7 illustrates the step shown in the exemplary method of FIG. 4 for reading metadata created for the first video and incorporating the metadata into a second video.

Reference is now made to FIG. 7, which illustrates the step shown in the exemplary method of FIG. 4 for reading metadata created for the first video and incorporating the metadata into a second video. In the event that a user elects to incorporate the special effects defined earlier for Video A into Video B, the metadata for Video A is read from the metadata database 610. For embodiments where multiple users generate special effects for the same video, the user may simply select which metadata to incorporate into Video B. By way of illustration, the metadata 606 corresponding to user 2 is selected. As described earlier, Video B contains the same content as Video A. However, Video B might be encoded in a different format (e.g., VCD vs. DVD format for Video A). It should therefore be appreciated that the embodiments described herein provide for incorporation of special effects across different formats.

The identified key frames ($C_1$, $C_2$, $C_3$) from Video A are read from the metadata and Video B are analyzed to see if any matches occur. At least one matching scene change or key frame must be found in Video B before the special effects are incorporated. Once the at least one matching scene change/key frame is identified, the time offsets corresponding to each of the scene changes is added in order to derive the insertion point for Video B. For some embodiments, the insertion point for Video B is derived from the scene change within the smallest corresponding time offset. For alternative embodiments, the insertion point may be derived based on each of the scene changes in order to insure that the insertion point in Video B is accurately derived.

Figure 8:
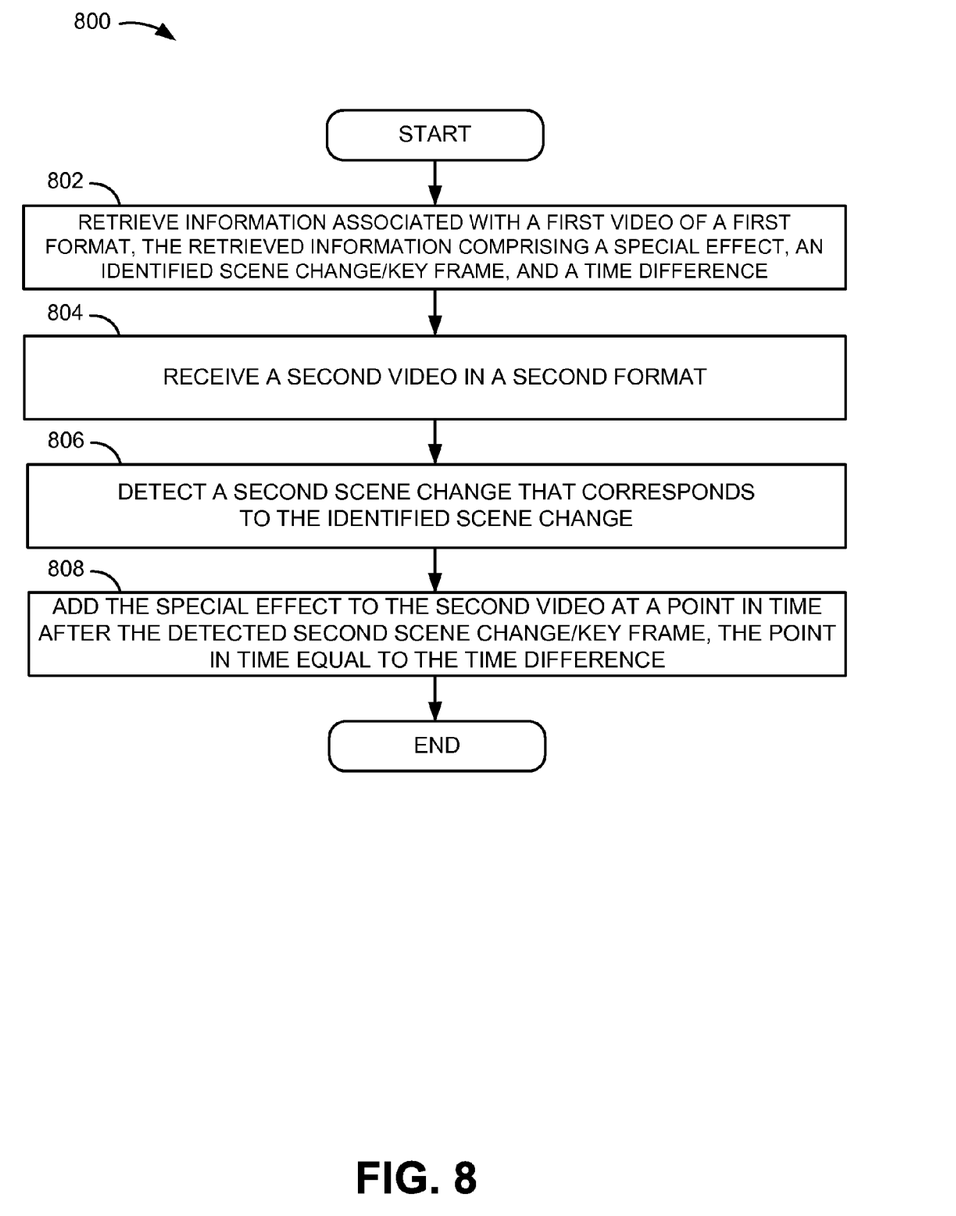
FIG. 8 depicts an alternative embodiment of a method for associating metadata with scene changes in a first video and incorporating the metadata in a second video.

Reference is now made to FIG. 8, which depicts an alternative embodiment of a method for associating metadata with scene changes/key frames in a first video and incorporating the metadata in a second video. Beginning with block 802, information associated with a first video of a first format is retrieved, where the retrieved information comprises a special effect, an identified scene change/key frame, and a time difference. Next, in block 804, a second video in a second format is received. In block 806, a second scene change that corresponds to the identified scene change is detected. In block 808, the special effect is then added to the second video at a point in time after the detected second scene change/key frame, where the point in time is equal to the time difference.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

At least the following is claimed:

1. A system for associating metadata with a video, the system comprising:
    an input module for reading a first video data stream, the input module configured to receive special effects specified by a user and an insertion point in which to insert the special effects;
    a key frame module for identifying at least one key frame preceding the specified insertion point, the key frame comprising at least one of a scene change and a particular scene identified by the user;
    a metadata module for calculating time differences between the insertion point and the one or more key frames, the metadata module further configured to store the special effects input by the user, the insertion point, the time differences, and key frames as metadata; and
    an insertion module for reading a second video data stream and inserting the special effects specified for the first video data stream into the second video data stream, wherein the first and second video data streams are encoded in different formats,
    the insertion module further configured to read the stored metadata and identify a matching key frame within the second video data stream, the insertion module further configured to add the time difference associated with the key frame stored within the metadata to the matching key frame to determine an insertion point for the second video data stream and add the special effects at the insertion point for the second video data stream.

2. The system of claim 1, wherein the key frame module identifies a single key frame.

3. The system of claim 1, wherein the key frame module identifies a plurality of key frames.

4. The system of claim 1, wherein the insertion module verifies that there are at least two matching key frames before inserting the special effects into the second video data stream.

5. The system of claim 1, wherein the key frame module identifies a key frame closest to the insertion point.

6. The system of claim 1, wherein the metadata module creates metadata based on special effects specified by a plurality of users.

7. A method for associating metadata with a video comprising:
receiving, in a computing device, special effects specified by a user;
receiving, in the computing device, an insertion point identified by the user;
identifying, in the computing device, at least one key frame preceding the insertion point;
calculating, in the computing device, time differences between the insertion point and the at least one key frame;
storing, in a memory accessible by the computing device, the special effects, the insertion point, and the time differences as metadata, wherein the special effects are specified for a first video data stream;
reading, in the computing device, a second video data stream;
accessing, in the computing device, key frame information from the stored metadata and identifying a matching key frame within the second video data stream;
adding, in the computing device, the associated time difference stored within the metadata to the matching key frame to determine an insertion point for the second video data stream; and
inserting, in the computing device, the special effects specified for the first video data stream into the second video data stream at the insertion point for the second video data stream, wherein the first and second video data streams are encoded in different formats.

8. The method of claim 7, wherein accessing key frame information from the stored metadata comprises identifying a key frame closest to the insertion point.

9. The method of claim 7, wherein inserting special effects into the second video data stream further comprises verifying that there are at least a second matching key frame before inserting the special effects into the second video data stream.

10. The method of claim 7, further comprising receiving, in the computing device, special effects from a plurality of users.

11. A program stored on a non-transitory computer readable medium, the program comprising:
logic for receiving special effects specified for a first video data stream by a user;
logic for receiving an insertion point from the user;
logic for identifying at least one key frame preceding the insertion point;
logic for calculating time differences between the insertion point and the at least one key frame;
logic for storing the special effects, the insertion point, and the time differences as metadata;
logic for reading a second video data stream;
logic for accessing key frame information from the stored metadata and identifying a matching key frame within the second video data stream;
logic for adding the associated time difference stored within the metadata to the matching key frame to determine an insertion point for the second video data stream; and
logic for inserting the special effects specified for the first video data stream into the second video data stream at the insertion point for the second video data stream, wherein the first and second video data streams are encoded in different formats.

12. The program of claim 11, wherein the logic for accessing key frame information from the stored metadata comprises logic for identifying a key frame closest to the insertion point.

13. The program of claim 11, wherein logic for inserting special effects into the second video data stream further comprises logic for verifying that there is at least a second matching key frame.

14. The program of claim 11, further comprising logic for receiving special effects from a plurality of users.

15. A video editing method comprising:
retrieving information from stored metadata associated with a first video data stream of a first format, the retrieved information comprising a special effect, an identified key frame preceding a specified insertion point in the first video data stream of the special effect, and a time difference;
receiving a second video data stream in a second format;
detecting a key frame in the second video data stream that corresponds to the identified key frame; and
adding the special effect into the second video data stream at the insertion point, at a point in time after the detected second key frame, the point in time equal to the time difference.

16. The method of claim 15, wherein the information is stored as metadata associated with the first video data stream.

* * * * *